US006852808B2

(12) United States Patent
Hüffer et al.

(10) Patent No.: US 6,852,808 B2
(45) Date of Patent: Feb. 8, 2005

(54) METHOD FOR PRODUCING HOMOPOLYMERS AND COPOLYMERS OF ISOBUTENE

(75) Inventors: Stephan Hüffer, Ludwigshafen (DE); Hans Peter Rath, Grünstadt (DE); Gabriele Lang, Mannheim (DE); Jens Kremeskötter, Mannheim (DE); Elmar Stöckelmann, Grünstadt (DE)

(73) Assignee: BASF Aktiengesellschaft, Ludwigshafen (DE)

(*) Notice: Subject to any disclaimer, the term of this patent is extended or adjusted under 35 U.S.C. 154(b) by 31 days.

(21) Appl. No.: 10/476,701

(22) PCT Filed: May 24, 2002

(86) PCT No.: PCT/EP02/05731

§ 371 (c)(1),
(2), (4) Date: Nov. 5, 2003

(87) PCT Pub. No.: WO02/096964

PCT Pub. Date: Dec. 5, 2002

(65) Prior Publication Data

US 2004/0171772 A1 Sep. 2, 2004

(30) Foreign Application Priority Data

May 25, 2001  (DE) .......................... 101 25 583

(51) Int. Cl.⁷ ............................ C08F 2/06; C08F 10/10
(52) U.S. Cl. ...................... 526/64; 526/135; 526/237; 526/348.7; 526/918
(58) Field of Search .................. 526/64, 135, 237, 526/918

(56) References Cited

U.S. PATENT DOCUMENTS

| | | | |
|---|---|---|---|
| 4,152,499 A | 5/1979 | Boerzel et al. | |
| 4,327,201 A | 4/1982 | Kennedy et al. | |
| 4,946,899 A | 8/1990 | Kennedy et al. | |
| 5,169,914 A | 12/1992 | Kaszas et al. | |
| 5,286,823 A | 2/1994 | Rath | |
| 5,811,501 A * | 9/1998 | Chiba et al. | 526/216 |
| 5,910,550 A | 6/1999 | Rath | |
| 5,962,604 A | 10/1999 | Rath | |
| 6,399,031 B1 * | 6/2002 | Herrmann et al. | 422/197 |
| 6,407,186 B1 | 6/2002 | Rath et al. | |
| 2004/0014911 A1 | 1/2004 | Huffer et al. | |
| 2004/0015029 A1 | 1/2004 | Lange et al. | |

FOREIGN PATENT DOCUMENTS

| | | |
|---|---|---|
| DE | 196 34 450 | 3/1998 |
| EP | 0 145 235 | 6/1985 |
| EP | 0 206 756 | 12/1986 |
| EP | 0 265 053 | 4/1988 |
| EP | 0 273 627 | 7/1988 |
| EP | 0 481 297 | 4/1992 |
| EP | 0 671 419 | 9/1995 |
| EP | 0 713 883 | 5/1996 |

OTHER PUBLICATIONS

Kennedy et al, "Designed Polymers by Carbocationic Macromolecular Engineering", Oxford University Press, New York 1991, pp. 96–104.

Henzler, "Continuous Mixing of Fluids", Ulmann's Encyclopedia of Industrial Chemistry, Fifth Completely Revised Edition, vol. B4, VCH Publishers, Inc. 1992, pp. 561–586.

* cited by examiner

*Primary Examiner*—Fred Teskin
(74) *Attorney, Agent, or Firm*—Nixon & Vanderhye P.C.

(57) ABSTRACT

Homo- and copolymers of isobutene are prepared by continuous cationic polymerization of isobutene or mixtures of isobutene with ethylenically unsaturated comonomers in the presence of an initiator system comprising:

i) a Lewis acid selected from covalent metal-halogen compounds and covalent semimetal-halogen compounds and ii) at least one aprotic organic compound I having at least one functional group FG which forms a carbocation or a cationic complex with the Lewis acid under polymerization conditions in an organic solvent inert with respect to the Lewis acid, by a process in which the polymerization is carried out in a tubular flow-through reactor which has a plurality of curves having an alternating direction of curvature.

19 Claims, 5 Drawing Sheets

METHOD FOR PRODUCING HOMOPOLYMERS AND COPOLYMERS OF ISOBUTENE

The present invention relates to a continuous process for the preparation of homo- and copolymers of isobutene by cationic polymerization of isobutene or mixtures of isobutene with ethylenically unsaturated comonomers which copolymerize with isobutene under the conditions of a cationic polymerization.

Polyisobutene and its copolymers are used in a variety of ways, for example for the preparation of fuel and lubricant additives, as elastomers, as adhesives for adhesive raw materials, as a base component of sealing and stopping compounds, in coating systems, in particular those having a barrier action for water vapor, and in chewing gum compositions. Block copolymers of isobutene with vinylaromatic monomers have, for example, elastomeric properties and high gas tightness.

The cationic polymerization of isobutene is frequently effected by boron trifluoride catalysis, in particular by polymerization of isobutene in the presence of boron trifluoride complex catalysts. Processes for this purpose have been described comprehensively in the prior art (cf. for example DE-A 27 02 604, EP-A 145 235, EP-A 481 297, EP-A 671 419, EP-A 628 575, EP-A 807 641 and WO 99/31151).

Kennedy et al. describe the homo- and copolymerization of isobutene under the conditions of a living cationic polymerization (cf. J. P. Kennedy et al. in U.S. Pat. No. 4,946,899, U.S. Pat. No. 4,327,201, U.S. Pat. No. 5,169,914, EP-A 206 756, EP-A 265 053 and comprehensively in J. P. Kennedy, B. Ivan, Designed Polymers by Carbocationic Macromolecular Engineering, Oxford University Press, New York 1991). The initiator system used for the cationic polymerization comprises, as a rule, at least one Lewis acid-metal halide complex as a catalyst and at least one organic compound which forms a carbocation or a cationic complex with the Lewis acid under the reaction conditions.

Although the living cationic polymerization leads to polymers having high molecular uniformity and moreover, in contrast to the boron trifluoride complex catalysis, also permits the specific preparation of block copolymers and of terminally functionalized polymers, it has only been of academic importance to date. This is presumably due, on the one hand, to the fact that it is difficult to control and, on the other hand, to its high requirement with respect to the purity of the reagents used. Because it is difficult to control, the living cationic polymerization is usually carried out as a batch process. The reaction vessels used are the stirred kettles customary for this purpose. In addition, the prior German patent applications P10061715.8 and P10061727.1 propose the use of conventional, helically wound tubular reactors, as also used, for example, in the polymerization of isobutene under boron trifluoride catalysis, for a continuous embodiment of the process.

The Applicant's own experiments have shown that the molecular uniformity of the polymers obtained by living cationic polymerization, in particular when the reaction is carried out continuously, is unsatisfactory. Since the molecular uniformity is an important quality criterion for homo- and copolymers of isobutene, it is an object of the present invention to provide a continuous process for the preparation of these polymers.

We have found that this object is achieved, surprisingly, by polymerizing isobutene or mixtures of isobutene with ethylenically unsaturated comonomers continuously in a helical tube reactor in the presence of an initiator system suitable for the living cationic polymerization.

The present invention thus relates to a process for the preparation of homo- and copolymers of isobutene by continuous cationic polymerization of isobutene or mixtures of isobutene with ethylenically unsaturated comonomers in the presence of an initiator system comprising:
i) a Lewis acid selected from covalent metal-halogen compounds and covalent semimetal-halogen compounds and
ii) at least one aprotic organic compound I having at least one functional group FG which forms a carbocation or a cationic complex with the Lewis acid under polymerization conditions in an organic solvent inert with respect to the Lewis acid, wherein the polymerization is carried out in a helical tube reactor.

Helical tube reactors are disclosed in WO 98/08602, which is hereby incorporated by reference for further details. A person skilled in the art understands a helical tube reactor as meaning a curved, tubular flow-through reactor having a substantially circular or ellipsoidal (tube) cross section, wherein said reactor (or the reaction tube) has a plurality of curves directly in succession and having an alternating direction of curvature. The direction of curvature is reversed preferably no later than when that distance of the center of gravity of the tube cross-sectional area which has been passed through from the beginning of a curve is 200 times the tube diameter. The curve may comprise up to three revolutions about the axis of curvature.

In the case of an ellipsoidal cross section of the reactor, tube diameter is understood as meaning the mean value of major and minor axes.

Curves having an alternating direction of curvature is to be understood here as meaning a sequence of curved tube segments, the respective next tube segment (section of the tube between two successive reversals of curvature, for example the sections between two points of intersection of axes in FIG. 1 to 4 of WO 98/08602) leading in a different direction, preferably the opposite direction, to the preceding one, i.e. there is a reversal of the direction of curvature with each curved tube segment.

Preferably, the reversal of the direction of curvature occurs no later than when that distance of the center of gravity of the tube cross-sectional area which has been passed through from the beginning of a curve is 150, in particular 100, preferably 80, particularly preferably 50, 30 or 25, times the tube diameter. This distance is in general at least 5, in particular from 10 to 150, especially from 10 to 100, preferably from 10 to 80, particularly preferably from 10 to 50, from 10 to 40 or from 10 to 30, times the tube diameter.

A curve may comprise not only a partial revolution but also one revolution or up to two or three revolutions about the axis of curvature. The angle covered by the normal vector of the main direction of flow of a curve until a change in the direction of curvature is thus in general $\leq 1080°$, preferably $\leq 720°$, particularly preferably $\leq 360°$.

The curves are preferably substantially sinusoidal curves. In the present case, sinusoidal curves are to be understood as meaning all types of, preferably periodically repeating, curves substantially in a plane. The following description relates to the graph (sinusoidal curve) described by the path of the center of gravity of the tube diameter of the curved tube. The ratio of amplitude of curvature (greatest distance from the graph to a straight line passing through two adjacent points of inflection of the graph) to the period length/4 (=half the distance between two points of reversal of the curvature or points of inflection of the sinusoidal curve) may vary within a wide range. However, it is preferably from 5:1 to 1:50, particularly from 3:1 to 1:5, particularly preferably 1:1. According to the invention, this includes both curves for which the tangent at the point of inflection makes a non-90° angle with the straight line passing through the points of inflection and those for which said angle is 90° i.e. semicircular tube segments arranged in series, which are particularly preferred.

The radius of curvature of the curved tube segments is preferably from 0.5 to 100, particularly preferably from 1 to 80, from 2 to 50 or from 2 to 20, times the diameter of the tube cross-sectional area.

The dimensions of the reactor are in general such that the ratio of length to diameter is from 100:1 to 1 000 000:1, preferably from 1 000:1 to 100 000:1 or 50 000:1.

If required, one or more of the curved tube segments may be connected by straight tube segments. The ratio of straight to curved tube distance is then $\leq 5$, preferably $\leq 2$, in particular $\leq 1$, particularly preferably $\leq 0.5$ or $\leq 0.25$.

The helical tube reactor may also comprise a plurality of reactor units, it being possible for the reactor in each unit to have a different geometry and/or dimensions and/or radii of curvature.

The tube cross section of the reactor is preferably circular or ellipsoidal. This also includes modified circular or ellipsoidal cross sections, for example cross sections which result from rounding of the corners of a square or of a rectangle. In the case of twisted tubes, the basic shape of the reactor tube is substantially circular or ellipsoidal.

In the case of an ellipsoidal cross section, the ratio of the major semiaxis to the minor semiaxis is in general from 5:1 to 1:1, in particular from 2:1 to 1:1.

Figure 2:
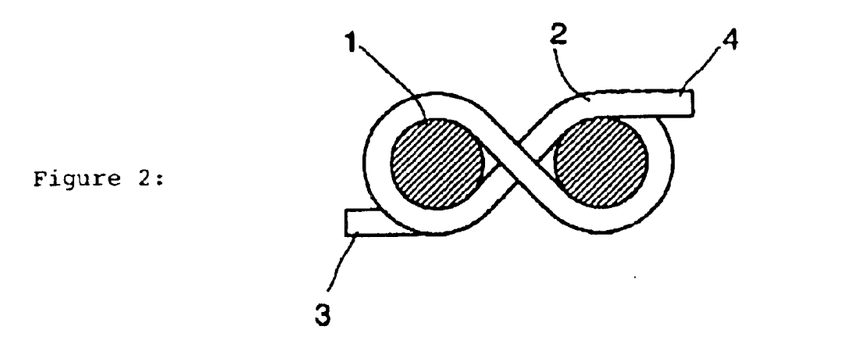
FIG. 2 shows a plan view of the reactor according to FIG. 1.
Figure 3:
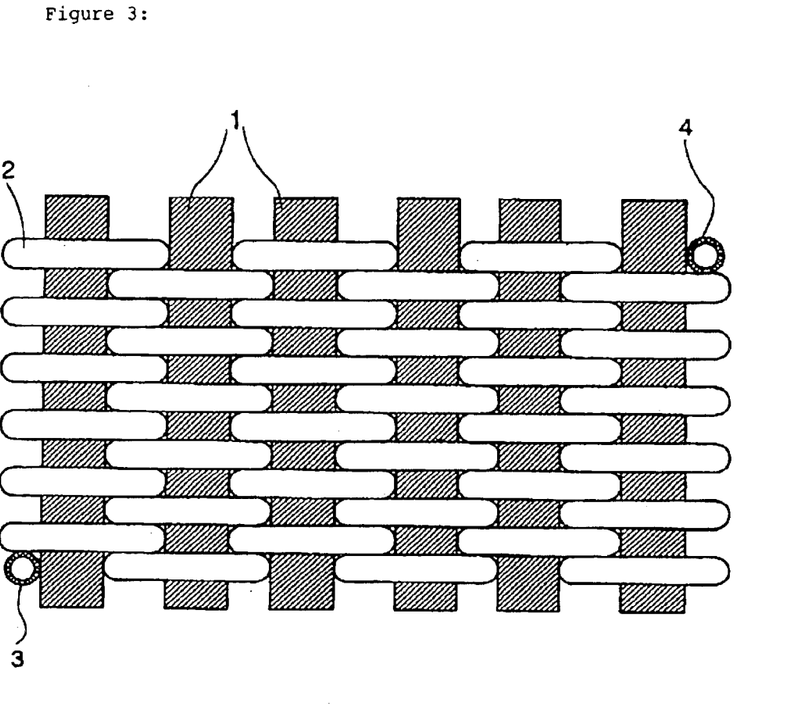
FIG. 3 shows a novel reactor in the form of a winding about six rods arranged in a plane.
Figure 4:
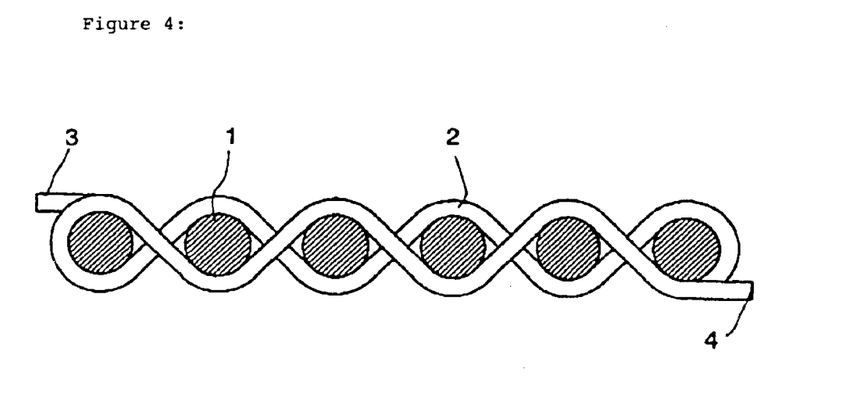
FIG. 4 shows a plan view of the reactor according to FIG. 3.

According to a preferred embodiment of the process, a helical tube reactor which, viewed from the entering flow, is in the form of an ascending and single-layer tube winding about at least two axes is used. The axes may make an angle with one another, but they are preferably substantially parallel. In the case of a winding which is not self-supporting, these axes can preferably be realized by tubes or rods which may be round or polygonal. The term winding about at least two axes is used here only for illustration. It is not necessary for the axes also to be realized in the application, for example in the form of tubes or rods. In the case of a winding about 2 parallel axes, for example, the arrangement shown in FIGS. 1, 2 and 5 results. If a winding is implemented about a plurality of axes preferably arranged in a plane, a band-like or wall-like design results, as shown in FIGS. 3 and 4.

According to another preferred embodiment of the process, a helical tube reactor which is designed as a winding about a plurality of axes passing substantially through the vertices of a polygon, in particular an equilateral polygon, and perpendicular to its surface is used. The polygon may have an even or, preferably, an uneven number of vertices, in particular at least 3 or 5 and preferably 7, 9 or 11 (cf. also FIGS. 6 and 7). A polygonal winding can be understood in terms of curves along angled axes combined to form a polygon (perpendicular to the preferably parallel axes mentioned).

The outer spacing of the axes about which the winding is led may be varied within a wide range. In general, it is from 1 to 10, preferably from 1 to 5, particularly from 1 to 3, times the diameter of the tube reactor, a single to double spacing being particularly preferred.

Furthermore, the winding is also determined by the pitch. It is in general from 1 to 10, in particular from 1 to 3, times the reactor diameter (in the case of a circular cross section) or, in the case of an ellipsoidal reactor cross section, from 1 to 10, in particular from 1 to 3, times the axis which points in the flight direction.

The helical tube reactor may be both of closed and of open design. A closed design is understood as meaning that the reactor tube forms a closed loop. The reaction mixture is circulated by suitable measures. The starting materials, solvent and initiator system are introduced into this circulation via corresponding apparatuses. The reaction mixture is removed continuously at the same rate. An open design is accordingly understood as meaning that starting materials, solvent and initiator system are fed in at one end of the reactor tube and the reaction mixture is removed at the other end. In the novel process, helical tube reactors of open design are preferably used.

The helical tube reactor may be produced from metal, a metal alloy, glass or a plastic. There are no limits at all here. All that is required is that the tube be resistant to the reactants and stable under the reaction conditions. If the reactor is produced from a plastic, fluorine-containing plastics, e.g. tetrafluoroethylene, and polyethylene, polypropylene or polyvinyl chloride are preferred. The tubes of the helical tube reactor may also have an internal coating. Examples of internal coatings are in particular fluorine-containing plastics, such as tetrafluoroethylene, polyethylene or polypropylene. In addition, the interior of the tube may be rendered inert by chemical treatment, for example passivated by treatment with nitric acid, electropolished, mechanically polished or electroplated, e.g. Ni on PTFE.

The helical tube reactor expediently has means for feeding in the reactants, catalysts, solvent, etc. and, if required, means for cleaning, for example by using pig systems, at one or more points along the curved tube. In general, measuring points and apparatuses for sampling are also provided along the curved reactor. Furthermore, it has means for transporting fluid streams.

Frequently, the means for feeding in the liquid reactants are combined with suitable mixing apparatuses, for example static mixers and/or dynamic mixers. Such apparatuses suitable for mixing fluids are known to a person skilled in the art, for example from H.-J. Henzler, Continuous Mixing of Fluids, Ullmann's Encyclopedia of Industrial Chemistry $5^{th}$ ed. on CD-Rom, Wiley, VCH 1997. Particularly in the case of the reactors of open design, the reactants, preferably in the form of a solution in the respective solvent, are fed to the reactor via suitable apparatuses for mixing fluids.

In addition, the reactor may comprise pulsation means, for example pumps, in order to effect a pulsed reaction procedure. Furthermore, a means by which, for example for the purpose of separation, gas bubbles of an inert gas, such as nitrogen, and/or pigs, can be fed in at the beginning of the curved tube or at any desired point along said tube may be provided. Moreover, conventional mixing elements, for example packings or static or dynamic mixers, can be provided in segments of the curved reactor, which as a rule do not exceed 10% of the reactor zone.

The reactor generally also comprises means for cooling the reaction medium. It may be possible to use for this purpose a coolable container which, if required, is divided into zones and completely or partially encloses the tube reactor in order to control the temperature in the desired manner. If the reactor is wound about rods, it is also possible for the rods to be in the form of tubes and the cooling medium to be allowed to flow through these tubes. The reactor may also be equipped with jacket cooling.

The figures which follow schematically show various helical reactor types having different winding configurations.

Figure 1:
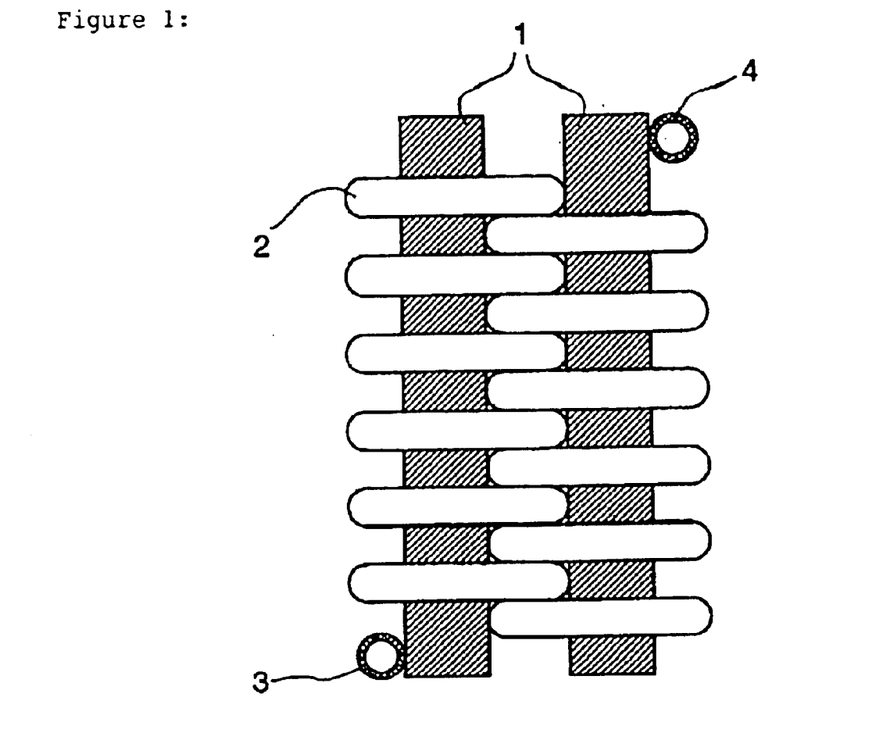
FIG. 1 shows the side view of a novel reactor in the form of a winding about two rods.
Figure 5:
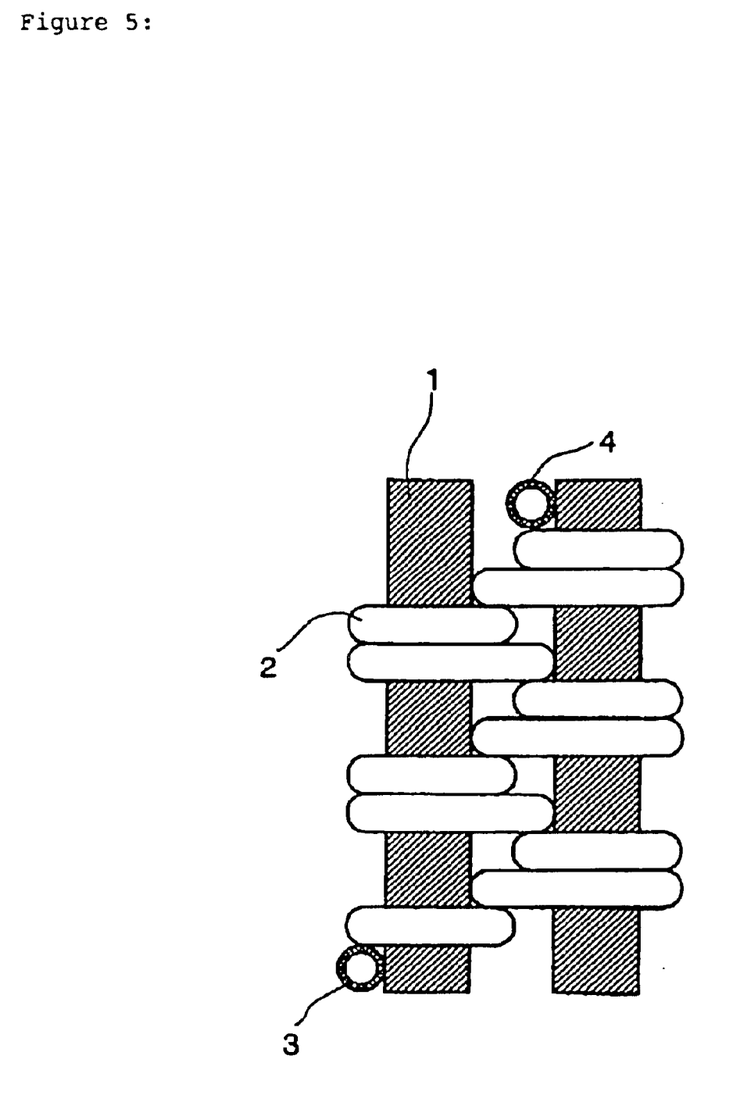
FIG. 5 shows the side view of a novel reactor in the form of a winding about two rods which is modified compared with FIG. 1.

FIG. 1 shows a novel reactor in the simplest embodiment as a winding. The reactor comprises two rods 1 parallel to one another. A tube is wound about these rods in such a way that a curved reactor 2 having an alternating direction of curvature results. This is clearly shown in FIG. 5, i.e. FIG. 5 shows a winding in the form of a horizontal figure of eight. The distance between the two rods 1 corresponds to about 1.5 times the diameter of the reactor 2. The reactor has a feed 3 and a discharge 4. i.e. the medium in the reactor 2 flows in an ascending direction.

FIG. 3 shows a further embodiment of a novel reactor. It comprises 6 rods 1 about which a tube 2 having a feed 3 and a discharge 4 is wound so that a braid about the rod 1 forms, resulting in a reactor in the form of a palisade wall. FIG. 4 shows that the winding substantially corresponds to a sinusoidal curve.

FIG. 5 shows an alternative embodiment of a winding about two rods 1. The winding is such that the radius of curvature of a curve covers about 600°.

Figure 6:
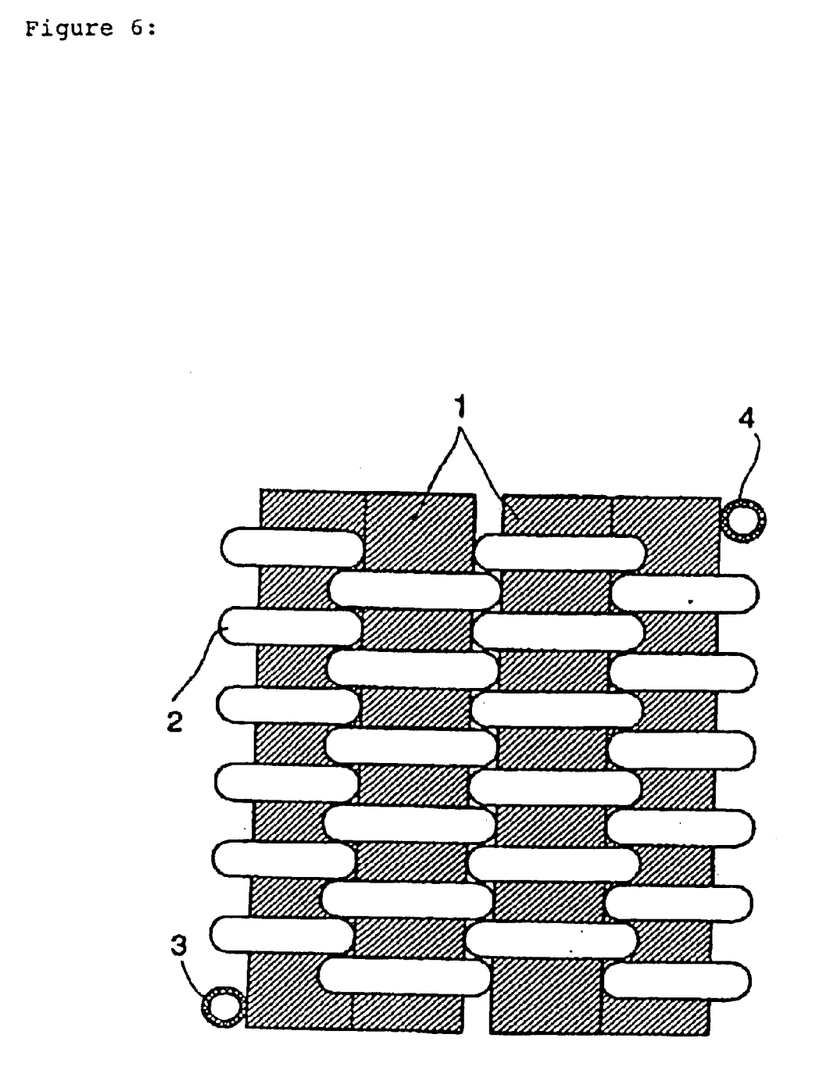
FIG. 6 shows a schematic partial view of a novel reactor in the form of a winding about 7 rods arranged at the vertices of an equilateral polygon.
Figure 7:
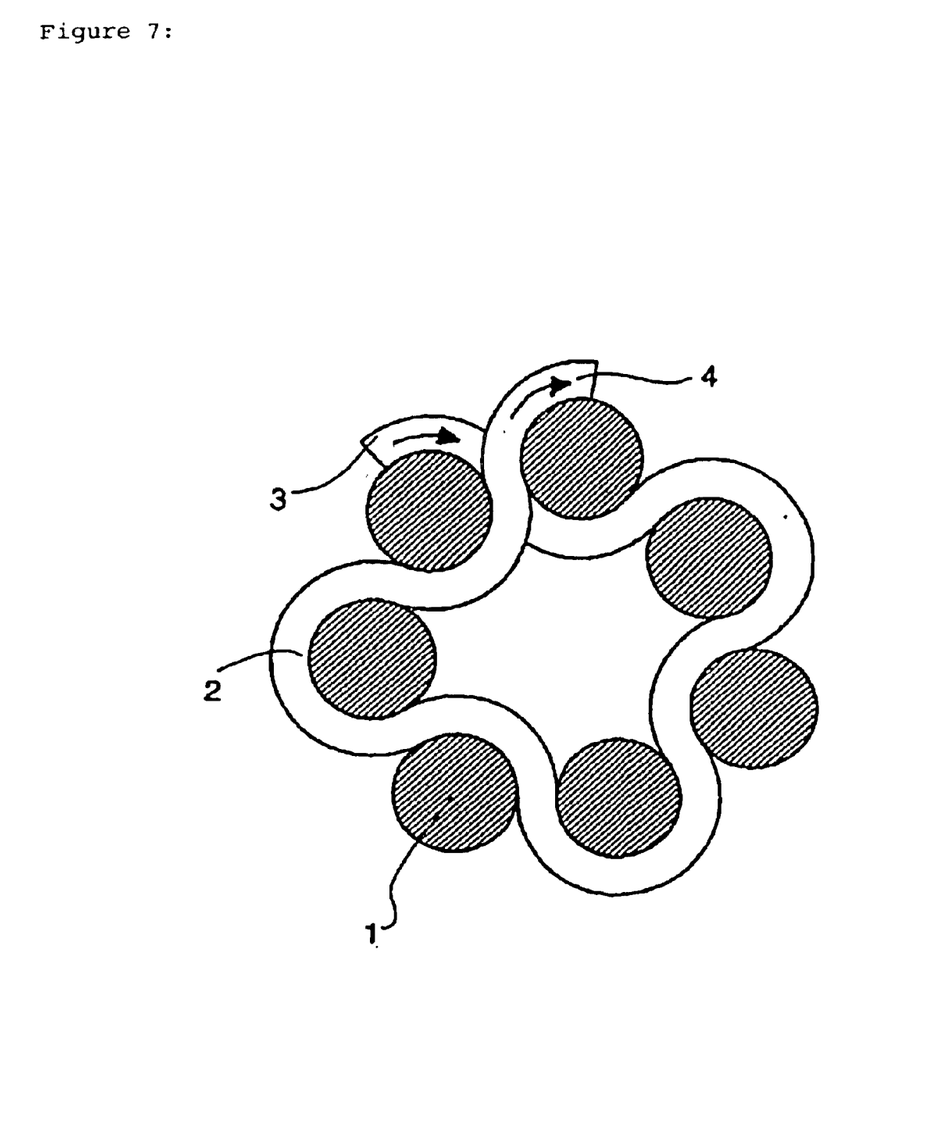
FIG. 7 shows a schematic plan view of the winding loop according to FIG. 6.

A further embodiment of the novel reactor is shown in FIG. 6 in the form of a partial side view. FIG. 7 shows an individual winding loop about seven rods 1 which are arranged at the vertices of an equilateral heptagon. The rods 1 are wound continuously with the tube 2 so that a basket-like winding results. This apparatus has a compact arrangement and is therefore particularly suitable for industrial use.

In the novel process, the polymerization of isobutene is initiated by the initiator system comprising at least one Lewis acid and at least one organic compound I. It is assumed that the Lewis acid reacts with the compound I to form a carbocation or at least a cation complex which interacts with the olefinically unsaturated double bond of the isobutene or of the comonomer and produces a positive (partial) charge in the monomer, for example on the tertiary carbon atom of the isobutene. This in turn interacts with a further isobutene molecule or a further monomer with continuation of the polymerization reaction. Suitable compounds I are therefore all those compounds which are known to form a carbocation or at least a cationic complex with the abovementioned Lewis acids.

The terms carbocation and cationic complex are not strictly separated from one another but include all intermediates of solvent-separated ions, solvent-separated ion pairs, cation pairs and strongly polarized complexes having a positive partial charge on a carbon atom of the compound I.

In principle, all organic compounds which have at least one nucleophilically displaceable leaving group X and which are capable of stabilizing a positive charge or partial charge on the carbon atom which carries a leaving group X are suitable as compounds of the formula I. These are known to include compounds which have at least one leaving group X which is bonded to a secondary or tertiary aliphatic carbon atom or to an allylic or benzylic carbon atom. Suitable leaving groups are in particular halogen, $C_1$–$C_6$-alkoxy and $C_1$–$C_6$-acyloxy.

Here, halogen is in particular chlorine, bromine or iodine, especially chlorine. $C_1$–$C_6$-Alkoxy may be both linear and branched and is, for example, methoxy, ethoxy, n-propoxy, isopropoxy, n-butoxy, isobutoxy, n-pentyloxy or n-hexyloxy.

$C_1$–$C_6$-Alkylcarbonyloxy is, for example, acetoxy, propionyloxy, n-butyroxy or isobutyroxy.

Compounds of the formula I in which the functional group is of the formula FG (FG)

where

X is selected from halogen, $C_1$–$C_6$-alkoxy and $C_1$–$C_6$-acyloxy, $R^1$ is hydrogen or methyl and $R^2$ is methyl or, with $R^1$ or the moiety to which the functional group FG is bonded, forms a $C_5$–$C_6$-cycloalkyl ring, or $R^2$ may also be hydrogen if the functional group FG is bonded to an aromatic or olefinically unsaturated carbon atom, are preferred.

The compounds of the formula I preferably have one, two, three or four, in particular one or two, functional groups FG. Preferably, X in the formula (FG) is a halogen atom, in particular chlorine.

Preferred compounds I are, for example, of the formulae I-A to I-D:

(I-A)

(I-B)

(I-C)

(I-D)

where X has the abovementioned meanings, n is 0, 1, 2, 3, 4 or 5, $R^3$, $R^4$ and $R^{10'}$ independently of one another, are hydrogen or methyl, $R^5$, $R^6$ and $R^{7'}$ independently of one another, are hydrogen, $C_1$–$C_4$-alkyl or a group $CR^3R^4$—X, where $R^3$, $R^4$ and X have the abovementioned meanings, and $R^8$ is hydrogen, methyl or a group X and $R^9$ and $R^{9'}$ are hydrogen or a group X.

In the formulae I-A to I-D, $R^3$ and $R^4$ are preferably both methyl. In the formula I-A, $R^6$ is, for example, a group $CR^3R^4$—X which is arranged para to the $CR^3R^4X$ group if $R^5$ is hydrogen. It may also be in the meta position if the group $R^5$ is $C_1$–$C_4$-alkyl or a group $CR^3R^4$—X. Preferred compounds I-A are, for example, 2-chloro-2-phenylpropane (cumyl chloride) and 1,4-bis(2-chloroprop-2-yl)benzene (para-dicumyl dichloride).

In formula I-B, $R^7$ is preferably a group $CR^3R^4$—X or hydrogen. Examples of compounds of the formula I-B are allyl chloride, methallyl chloride, 2-chloro-2-methylbut-2-ene and 2,5-dichloro-2,5-dimethylhex-3-ene.

In the compounds I—C, $R^3$ is preferably methyl. $R^2$ is preferably likewise methyl. $R^9$ is preferably a group X, and in particular halogen, especially if $R^{10}$ is methyl. Examples of compounds of the formula I-C are 1,8-dichloro-4-p-methane (limonene dihydrochloride), 1,8-dibromo-4-p-menthane (limonene dihydrobromide), 1-(1-chloroethyl)-3-chlorocyclohexane, 1-(1-chloroethyl)-4-chlorocyclohexane, 1-(1-bromoethyl)-3-bromocyclohexane and 1-(1-bromoethyl)-4-bromocyclohexane.

Among the compounds of the formula I-D, those in which $R^8$ is methyl are preferred. Compounds of the formula I-D in which $R^8$ is a group X, and in particular a halogen atom, if n is >0 are also preferred.

With regard to the use of the polyisobutenes prepared by the novel process as fuel or lubricant additives, preferred compounds I are the compounds of the formula I-D, and among these in particular those in which X is a halogen atom. In the formula I-D, n is preferably 1, 2, 3 or 4, in particular 1 or 2, or is 0 if $R^8$ is methyl. For many other purposes, in particular in the preparation of medium molecular weight and higher molecular weight polymers, for example above 2 000, in particular above 3 000, Dalton, the compounds I-A are preferred.

As a rule, the compound I is used in the novel process in an amount of at least $10^{-6}$ mol per mole of isobutene or per mole of polymerizable monomers, in order to provide a sufficient concentration of initiator complexes. As a rule, the amount of the compounds I will not exceed 1 mol per mole of monomers (or isobutene) to be polymerized. These data and the data provided below on amounts of the compound I are always based on the number of functional groups (FG) in the compound I, unless stated otherwise. The compounds of the formula I are preferably used in an amount of from $10^{-5}$ to $10^{-1}$, in particular from $10^{-4}$ to $5\times10^{-2}$, mol, based on the functional groups (FG) of the compound I, per mole of isobutene or polymerizable monomers. Here, it should be taken into account that the achieved molecular weight of the polyisobutene prepared by the novel process is dependent on the amount of compound I in such a way that the molecular weight of the polyisobutene decreases with increasing concentration of compound I.

Suitable Lewis acids are in principle covalent metal halides and semimetal halides which as a rule have an electron pair gap. Such compounds are known to a person skilled in the art, for example from Kennedy et al., loc. cit., and are as a rule selected from covalent metal-halogen compounds of titanium, of tin, of aluminum, of vanadium or of iron and the halides of boron. The chlorides and, in the case of aluminum, also the monoalkylaluminum chlorides and the dialkylaluminum chlorides are preferred. Examples of preferred Lewis acids are titanium(IV) chloride, boron trichloride, tin(IV) chloride, aluminum trichloride, vanadium(V) chloride, iron(III) chloride, $C_1$–$C_6$-alkyl-$AlCl_2$ and $(C_1$–$C_6$-alkyl$)_2AlCl$. Particularly preferred Lewis acids are titanium(IV) chloride and boron trichloride.

The Lewis acid is of course used in the novel process in an amount which is sufficient for the formation of the initiator complex. This is as a rule ensured even at low concentrations of the Lewis acid in the reaction medium. Preferably, the molar ratio of Lewis acid to compound I is from 20:1 to 1:20, in particular from 10:1 to 1:10. The concentration of the Lewis acid in the reaction medium is as a rule from $10^{-3}$ to 1, preferably from $5\times10^{-3}$ to 0.3, in particular from 0.01 to 0.2, mol/l.

The concentration of the isobutene to be polymerized can be varied over wide ranges, the viscosity of the reaction mixture increasing with increasing molecular weight and/or increasing concentration of product. For this reason, the isobutene concentration in the starting material stream fed in is usually from 1 to 60, preferably from 2 to 40, in particular from 3 to 30, % by weight.

It has furthermore proven useful to carry out the polymerization of the isobutene in the presence of a donor compound. Suitable donor compounds are in principle all aprotic organic compounds which have a free electron pair present on a nitrogen, oxygen or sulfur atom. The free electron pair acts as a nucleophile with the Lewis acid and thus modifies its catalytic action. Preferred donor compounds are selected from pyridines, such as pyridine, 2,6-dimethylpyridine, 2,6-diisopropylpyridine and 2,6-di-tert-butylpyridine, N,N-dialkylamides of aliphatic or aromatic carboxylic acids, such as N,N-dimethylacetamide, N-alkyllactams, such as N-methylpyrrolidone, dialkyl ethers, such as diethyl ether and diisopropyl ether, cyclic ethers, such as tetrahydrofuran, trialkylamines, such as triethylamine, $C_1$–$C_4$-alkyl esters of aliphatic $C_1$–$C_6$-carboxylic acids, such as ethyl acetate, dialkyl thioethers or alkyl aryl thioethers, such as methyl phenyl sulfide, dialkyl sulfoxides, such as dimethyl sulfoxide, alkyl nitriles, such as acetonitrile and propionitrile, trialkylphosphines or triarylphosphines, such as trimethylphosphine, triethylphosphine, tri-n-butylphosphine and triphenylphosphine, and nonpolymerizable, aprotic organosilicon compounds which have at least one organic radical bonded via oxygen. This radical has as a rule 1 to 20 carbon atoms. Examples of such radicals are alkyloxy, cycloalkyloxy, aryloxy, arylalkyloxy and acyloxy (alkylcarbonyloxy).

Among the abovementioned donors, pyridine and sterically hindered pyridine derivatives and in particular organosilicon compounds are preferred. In a particularly preferred embodiment, at least one organosilicon compound II is used as a donor.

Sterically hindered pyridines are those which have bulky alkyl groups at least in the 2- and 6-position of the pyridine ring, e.g. 2,6-diisopyridine and 2,6-di-tert-butylpyridine.

The donor and in particular the organosilicon compound II are preferably used in an amount such that the molar ratio of donor molecules or of silicon atoms in the organosilicon compound II to the metal atoms or the semimetal atoms in the Lewis acid is from 0.05:1 to 50:1, preferably from 0.1:1 to 10:1, particularly preferably from 0.1:1 to 2:1. Very particularly preferably, the donor or the organosilicon compound II is used in less than the stoichiometric amount (calculated as the ratio of the silicon atoms to the (semi) metal atoms).

Alkyl is understood here and below as meaning a linear or branched saturated hydrocarbon radical of, as a rule, 1 to 20, preferably 1 to 10, carbon atoms, such as methyl, ethyl, n-propyl, isopropyl, n-butyl, isobutyl, tert-butyl, 2-butyl, n-pentyl, 2-methylbut-1-yl, 2-methylpent-1-yl, 2-ethylbut-1-yl, n-hexyl, 2-hexyl, 2-methylhex-1-yl, 2-ethylhex-1-yl, n-heptyl, n-octyl, isooctyl or n-decyl, and comparable radicals.

Aryl is an aromatic hydrocarbon radical of, as a rule, 6 to 20 carbon atoms, such as phenyl, naphthyl and comparable groups which may have one or more $C_1–C_{10}$-alkyl groups as substituents, e.g. tolyl, isopropylphenyl, xylyl or tert-butylphenyl.

Here, cycloalkyl is as a rule a 5-, 6- or 7-membered, saturated carbocycle which may have one or more $C_1–C_{10}$-alkyl groups as substituents.

Arylalkyl is an alkyl radical of, as a rule, 1 to 10, preferably 1 to 4, carbon atoms, which is substituted by an aryl radical as defined above, e.g. is benzyl or 2-phenylethyl.

Alkoxy is alkyl bonded via an oxygen atom. Accordingly, aryloxy, cycloalkoxy and arylalkoxy are respectively aryl, cycloalkyl and arylalkyl bonded via an oxygen atom.

Acyloxy is an alkylcarbonyl radical which is bonded via oxygen and preferably has 1 to 6 carbon atoms in the alkyl moiety, for example is acetyloxy, propionyloxy, butyroxy, etc.

The organosilicon compounds II may have one or more, e.g. 2 or 3, silicon atoms with at least one organic radical bonded via oxygen. Preferred organosilicon compounds II are those which have one, two or three, in particular two or three, organic radicals bonded via oxygen per silicon atom.

Preferred organosilicon compounds are those which are of the formula II:

$$R^a{}_nSi(OR^b)_{4-n}$$

where n is 1, 2 or 3, $R^a$ may be identical or different and, independently of one another, are $C_1–C_{20}$-alkyl, $C_5–C_7$-cycloalkyl, aryl or aryl-$C_1–C_4$-alkyl, it being possible for the three last-mentioned radicals also to have one or more $C_1–C_{10}$-alkyl groups as substituents, and $R^b$ are identical or different and are $C_1–C_{20}$-alkyl or, where n is 1 or 2, two different radicals $R^b$ may also form a 2- or 3-membered alkylene unit.

In formula II, n is preferably 1 or 2. $R^a$ is preferably $C_1–C_8$-alkyl, in particular branched alkyl or alkyl bonded via a secondary carbon atom, such as isopropyl, isobutyl or 2-butyl, or a 5-, 6- or 7-membered cycloalkyl group. $R^2$ is preferably $C_1–C_4$-alkyl.

Examples of such preferred compounds are dimethoxydiisopropylsilane, dimethoxyisobutylisopropylsilane, dimethoxydiisobutylsilane, dimethoxydicyclopentylsilane, dimethoxyisobutyl-2-butylsilane, diethoxyisobutylisopropylsilane, triethoxytoluylsilane and triethoxybenzylsilane.

According to the novel process, both isobutene as such and monomer mixtures of isobutene with olefinically unsaturated monomers which are known to be copolymerizable with isobutene under cationic polymerization conditions can be reacted. The novel process is moreover suitable for the block copolymerization of isobutene with ethylenically unsaturated comonomers polymerizable under cationic polymerization conditions. If monomer mixtures of isobutene with suitable comonomers are to be polymerized, the monomer mixture preferably contains more than 80, in particular more than 90, particularly preferably more than 95, % by weight of isobutene and less than 20, preferably less than 10, in particular less than 5, % by weight of comonomers.

Suitable copolymerizable monomers are vinylaromatics, such as styrene, α-methylstyrene, $C_1–C_4$-alkylstyrenes, such as 2-, 3- and 4-methylstyrene and 4-tert-butylstyrene, isoolefins of 5 to 10 carbon atoms, such as 2-methylbut-1-ene, 2-methylpent-1-ene, 2-methylhex-1-ene, 2-ethylpent-1-ene, 2-ethylhex-1-ene and 2-propylhept-1-ene. Suitable comonomers are furthermore olefins which have a silyl group, such as 1-trimethoxysilylethene, 1-(trimethoxysilyl)propene, 1-(trimethoxysilyl)-2-methlyprop-2-ene, 1-[tri(methoxyethoxy)silyl]ethene, 1-[tri(methoxy)silylpropene, and 1-[(tri(methoxyethoxy)silyl]-2-methylprop-2-ene.

Preferred embodiments of the novel process relate to the homopolymerization of isobutene or isobutene-containing starting materials and the block copolymerization of isobutene with vinylaromatic monomers. Here, the isobutene starting materials contain, as a rule, less than 5% by weight, based on the total amount of the isobutene-containing starting material, of copolymerizable monomers. For the block copolymerization, this also applies in an analogous manner to the vinylaromatic monomers.

Suitable isobutene starting materials for the novel process are both isobutene itself and isobutene-containing $C_4$-hydrocarbon streams, for example refined $C_4$ fractions, $C_4$ cuts from isobutene dehydrogenation and $C_4$ cuts from steam crackers and FCC crackers (FCC: Fluid Catalysed Cracking), if they are substantially free of 1,3-butadiene contained therein. $C_4$-Hydrocarbon streams suitable according to the invention contain, as a rule, less than 500, preferably less than 200, ppm of butadiene. When $C_4$ cuts are used as starting material, the hydrocarbons differing from isobutene play the role of an inert solvent.

Suitable solvents are all low molecular weight, organic solvents which differ from the compounds I and II and the polymerizable monomers, in particular isobutene, which have no abstractable protons and which, if necessary as a mixture with one another, are fluid under the polymerization conditions. Preferred solvents are hydrocarbons, for example acyclic alkanes of 2 to 8, preferably 3 to 6, carbon atoms, such as ethane, isopropane, n-propane, n-butane and its isomers, n-pentane and its isomers, n-hexane and its isomers and n-heptane and its isomers, cyclic alkanes of 5 to 8 carbon atoms, such as cyclopentane, methylcyclopentane, cyclohexane, methylcyclohexane and cycloheptane, acyclic alkenes of, preferably, 2 to 8 carbon atoms, such as ethene, isopropene, n-propene, n-butene, n-pentene, n-hexene and n-heptene, cyclic olefins, such as cyclopentene, cyclohexene and cycloheptene, aromatic hydrocarbons, such as toluene, xylene and ethylbenzene, and halohydrocarbons, for example halogenated alkanes having 1 to 5 carbon atoms and 1, 2, 3, 4, 5 or 6 halogen atoms, selected from fluorine or in particular chlorine, such as methyl chloride, dichloromethane, trichloromethane, ethyl chloride, 1,2-dichloroethane and 1,1,1-trichloroethane and chloroform, and haloaromatics, such as chlorobenzene.

Not only the solvents as such but also mixtures of these solvents are suitable. Mixtures are preferred in particular when the solvent has a melting point above the desired polymerization temperature.

Solvents and solvent mixtures which comprise at least one hydrocarbon are particularly preferred. Particularly preferred among these are solvent mixtures which comprise at least one hydrocarbon and at least one haloalkane. Particularly preferred among these are solvent mixtures which comprise at least one acyclic alkane of 4 to 6 carbon atoms, in particular hexane, and at least one chloroalkane, in particular methyl chloride or methylene chloride. Also particularly preferred are solvent mixtures which comprise at least one aromatic hydrocarbon, in particular toluene, and at least one chloroalkane, in particular methyl chloride or methylene chloride. The volume ratio of hydrocarbon to halogenated hydrocarbon is preferably from 1:10 to 10:1, in particular from 4:1 to 1:4. Of course, the chloroalkanes in these mixtures include no compounds in which chlorine atoms are present on secondary or tertiary carbon atoms. Also particularly preferred are ternary solvent mixtures which comprise at least one aromatic hydrocarbon, in particular toluene, at least one acyclic alkane of 4 to 6 carbon atoms, in particular hexane, and at least one chloroalkane, in particular methyl chloride or methylene chloride. The volume ratio of the three abovementioned components is then chosen so that the ratio of alkane to aromatic is from 1:10 to 10:1 and the volume ratio of alkane+aromatic to haloalkane is from 10:1 to 1:1. If polymerization is carried out with evaporative cooling, the solvents or the solvent mixtures then also contain up to 50, e.g. from 5 to 50, preferably from 10 to 30, % by volume of a readily vaporizable solvent component, e.g. ethylene.

Of course, the polymerization is carried out under substantially aprotic, in particular under anhydrous, reaction conditions. Aprotic or anhydrous reaction conditions are understood as meaning that the water content (or the content of protic impurities) in the reaction mixture is less than 50 ppm, in particular less than 5 ppm. As a rule, the starting materials are therefore dried physically and/or by chemical measures before their use. For example, after conventional preliminary purification and preliminary drying, the aliphatic or cycloaliphatic hydrocarbons preferably used as solvents can be mixed with an organometallic compound, for example an organolithium, organomagnesium or organoaluminum compound, in an amount sufficient for removing traces of water from the solvent. The solvent treated in this manner is then condensed directly into the reaction vessel. It is also possible to proceed in a similar manner with the α-olefins, the aromatic hydrocarbons and the monomers to be polymerized, in particular the isobutene.

The preliminary purification or preliminary drying of the solvents and of the isobutene is effected in a conventional manner, preferably by treatment with solid drying agents, such as molecular sieves or predried oxides, such as calcium oxide or barium oxide. The starting materials for which treatment with metal alkyls is not suitable, for example the alkyl halides used as solvents and the compounds I and II, can be dried in an analogous manner.

The polymerization of the isobutene or of the isobutene-containing monomer mixture takes place in principle spontaneously on mixing the initiator system used according to the invention with the isobutene or the isobutene-containing monomer mixture in the inert organic solvent at the desired reaction temperature. As a rule, the starting materials, i.e. the monomers to be polymerized, the solvent and the initiator system, are therefore fed continuously in the desired ratios to the helical tube reactor and reaction product is removed continuously so that more or less steady-state polymerization conditions are established in the reactor. The components of the initiator system may be fed in both separately from one another and together, preferably diluted in the solvent. For example, the addition of the components of the initiator system which are diluted in the solvent can be effected via multimedium nozzles in order to achieve thorough mixing of the components. Of course, it is also possible to add a preformed initiator system, i.e. a mixture of Lewis acid and compound I and, if required, donor. The isobutene to be polymerized or the isobutene-containing monomer mixture can be fed in as such, diluted with a solvent or as an isobutene-containing hydrocarbon stream. Preferably, the initiator system and the isobutene-containing product stream to be polymerized are fed separately from one another to the helical tube reactor.

As stated above, the novel process is preferably carried out in a helical tube reactor of open design. Here, it is possible to proceed in such a way that all components are fed into the reactor simultaneously, preferably via one or more mixing apparatuses at one end of the reaction tube. It is of course also possible for a part of the component to be fed into the reactor downstream of this feed point, preferably likewise via an apparatus suitable for mixing. Frequently, the Lewis acid and/or the initiator compound are fed into the reactor downstream of the feed of the monomers and the solvent. Here, a liquid monomer stream which may already contain the donor compound is frequently first prepared by mixing solvent and monomers. The Lewis acid and the compound I can then be fed in succession into the monomer stream while cooling, the feed preferably being effected via apparatuses suitable for mixing liquids. The fluid stream is fed into the helical tube reactor at the latest with the feed of the last component, it also being possible to feed in the last component in the helical tube reactor so that the actual polymerization takes place in the helical tube reactor. Preferably, first compound I and then the Lewis acid are fed into the monomer stream.

The novel process can be carried out in a particularly simple manner by first preparing a monomer stream of the compounds I, if required the donor compound, the solvent and the monomers, which monomer stream is cooled and is then fed into the helical tube reactor via a mixing apparatus, the Lewis acid being simultaneously fed into the reactor or into the monomer stream via the mixing apparatus.

Lewis acid, donor compound and compound I are preferably handled or metered as dilute solutions in the solvent used for the polymerization or in a solvent component thereof. The concentration of these compounds in these solutions is then preferably from 0.01 to 5, in particular from 0.05 to 1 mol/l.

As a rule, the novel process is carried out at below 0° C., for example from 0 to 140° C., preferably from −30 to −120° C., particularly preferably from −40 to −110° C. The reaction pressure is of minor importance and depends in a known manner on the reaction conditions.

The average residence time of the reactants (isobutene-containing starting material, initiator and solvent) in the reactor is as a rule from 1 minute to 1 hour, preferably from 1.5 to 45 minutes, in particular from 2 to 30 minutes.

The residence time is preferably chosen so that, under the reaction conditions, a monomer conversion of at least 50%, in particular at least 80%, is ensured of course, the polymerization can also be carried out at lower conversions. For economic reasons, unconverted monomers are generally recovered and recycled to the novel process.

The heat of reaction is removed in a conventional manner, for example by wall cooling and/or with the use of evaporative cooling. Here, the use of ethene and/or mixtures of ethene with the solvents stated above as being preferred has proven particularly useful.

In order to recover the isobutenes from the reaction mixture, the latter is deactivated after the polymerization in the manner customary for cationic polymerization reactions, preferably by adding a protic compound, in particular by adding alcohols, such as methanol, ethanol, n-propanol, isopropanol, n-butanol, isobutanol, sec-butanol or tert-butanol, or mixtures thereof with water. Preferably, the substances used for the deactivation are employed in a diluent, for example one of the solvents, in order to avoid an undesirable increase in viscosity. Otherwise, here too reference may be made to the prior art cited at the outset on the polymerization of boron trifluoride with isobutene, the working-up measures of which can be applied in an analogous manner to the novel process.

In a further embodiment of the invention, the polymerization is stopped by adding a trialkylallylsilane compound, for example by adding trimethylallylsilane (($CH_3$)$_3$Si—$CH_2$—CH=$CH_2$). Such compounds are usually used in amounts of from 0.3 to 3, preferably from 0.5 to 1.5, mol per mole of functional groups FG. The use of the allylsilanes results in stoppage of the polymerization with introduction of a propenyl group at the end of the polymer chain. For further details about this reaction, reference may be made at this point to EP-A 713 883.

The composition used for the deactivation or the mixture thereof with an inert solvent is cooled to the polymerization temperature before the deactivation, in order to avoid undesired secondary reactions.

The solvent is then removed in suitable units, such as rotary, falling-film or thin-film evaporators or by means of flashing (this is understood as meaning letting down the reaction solution downstream of the heat exchanger into pipelines or via a perforated plate or nozzle plate). Reduced pressure, for example of from 0.1 to 800, in particular from 1 to 100, mbar is preferably applied for removing the solvent. Bottom temperatures of from 50 to 250° C., in particular from 150 to 220° C., are preferred.

The novel process is suitable in particular for the preparation of polyisobutenes, i.e. polymers which are composed of at least 80%, preferably at least 90%, of isobutene in the form of polymerized units. Polyisobutenes having number average molecular weights $M_n$ of from 400 to 400 000, preferably from 500 to 200 000, particularly preferably from 700 to 100 000, Dalton are obtainable by the novel process. The process is preferably suitable for the preparation of polyisobutenes having number average molecular weights above 2 000, in particular above 3 000, Dalton. The molecular weight obtained can be varied in a simple manner by a person skilled in the art by varying the concentration of compound I used, a high concentration of compound I leading to polymers having a low molecular weight, and a low concentration of compound I leading to polymers having higher molecular weights. Moreover, the polymers obtained by the novel process have functional terminal groups, for example halogen atoms or olefinically unsaturated double bonds, which can be used for further functionalization measures. This is of interest in particular for the preparation of fuel and lubricant additives, which as a rule are composed of a hydrophobic hydrocarbon radical, for example a polyisobutenyl group, and a hydrophilic moiety.

The additives prepared by the novel process surprisingly have a narrow molecular weight distribution. The dispersity D (quotient of the weight average molecular weight $M_w$ and the number average molecular weight $M_n$) of the polymers obtained by the novel process is preferably less than 1.4, in particular less than 1.35, particularly preferably from 1.05 to 1.3. By using organosilicon donors II, it is even possible to prepare polymers having a molecular nonuniformity of from 1.05 to 1.25.

All data on molecular weights relate to values determined by means of gel permeation chromatography (GPC). The gel permeation chromatography was carried out using THF as mobile phase and $CS_2$ as reference on two columns connected in series (1 300 mm, d 7.8 mm), the first column being packed with Styragel HR5 (molecular weight range from 50 000 to 4×10$^6$) and the second column with Styragel HR3 (molecular weight range from 200 to 30 000) from Waters. The detection was effected by means of a differential refractometer. The standards used for determining the isobutene block were commercial polyisobutene standards in the molar mass range from 224 to 1 000 000, from Polymer-Standards Service, Mainz, Germany. In the determination of the block copolymers, a polystyrene calibration file and UV detector were additionally used.

The examples which follow illustrate the invention without restricting it.

I. Analysis

The molecular weight was determined by means of gel permeation chromatography (GPC) against polyisobutene standards in the manner described above.

II. General preparation methods for the novel polymerization process and the comparative investigations not according to the invention:

II.1 Reactors:

The helical tube reactor used was a 20 m long polytetrafluoroethylene tube having a tube cross section (internal diameter) of 3 mm, which had been wound, analogously to the configuration shown in FIGS. 6 and 7, about 9 support tubes having an external diameter of 25 mm, which were arranged at the vertices of an equilateral nonagon having a radius of 70 mm. The radius of curvature was 18 mm. The ratio of radius of curvature to tube diameter was accordingly 6 and the reactor volume was 0.14 l. At one end, the reactor had a mixing apparatus consisting of static mixer and a feed line in the form of a Y- or T-piece. The other end was connected to an uncooled receiver which had a stirrer and contained a 20% strength by volume solution of isopropanol in water (temperature 10° C.). The reactor was cooled to the desired reaction temperature in a cold bath.

Conventional tubular reactor: Here too, the tubular reactor used was a 20 m long polytetrafluoroethylene tube having a tube cross section (internal diameter) of 3 mm, which, however, in contrast to the helical tube reactor, had been wound in a circular manner in 50 loops having a loop diameter of about 120 mm and was otherwise equipped in the same way as the helical tube reactor. The working-up was carried out as in the case of the helical tube reactor.

Batch reactor: Two dropping funnels with cooling apparatus of in each case were placed in a 2 l four-necked flask having a stirrer and dry ice cooling. Both dropping funnels contained a bed of dry 3 Å molecular sieve over glass wool.

2. Carrying out the continuous experiments:

Isobutene, the respective solvent, the donor compound and the compound I were mixed by means of a first mixer to give a starting material stream and were precooled to the desired temperature. The feed rate of isobutene was 2.1 mol/h. The feed rate of the donor compound and of the compound I is shown in table 1. The donor compound and the compound I were fed in in the form of 0.2 M solutions in toluene. This cooled starting material stream was fed into the reactor via the further mixing element, which had a feed line for feeding in the Lewis acid. The Lewis acid was fed in via this line in the form of a 0.2 M solution in toluene. In all cases, the Lewis acid used was titanium tetrachloride. The feed rate of the Lewis acid is shown in table 1.

The flow rate in the reactor was established by regulating the solvent flow to a rate of from 2.2 to about 8 cm/sec. This corresponds to an average residence time of the reactants of from 4 to 15 minutes.

After an operating time of from 30 to 90 minutes, the organic mixture obtained in the receiver was removed and was washed with three times 200 ml of water. Thereafer, the organic phase was evaporated down and was dried at 200° C. to a final reduced pressure of 2 mbar.

The results of the experiments are shown in table 1.

3. Carrying out the batch experiments:

In one dropping funnel, 420 ml of a solvent mixture were dried for 20 minutes at −78° C. The solvent was then metered into the reaction flask which had been preheated to the desired temperature. 2.1 mol of isobutene were condensed into the other, cooled dropping funnel. The total amount of isobutene was then introduced into the reaction flask in the course of 25 minutes. While maintaining the temperature, the donor, the compound I and then titanium tetrachloride were then added in succession via a septum with vigorous stirring. After 3 hours, 1 mol of isopropanol was added at −70° C., the temperature was increased to room temperature and the reaction solution was then washed with three times 200 ml of water. Thereafter, the reaction solution was evaporated down and was dried at 200° C. to a final reduced pressure of 2 mbar. The amounts used are shown in table 1. The properties of the polymers are listed in table 2.

TABLE 2

| | Polymer properties | |
|---|---|---|
| Example | Molecular weight $M_n$ [Dalton] | Dispersity $[M_w/M_n]$ |
| 1 | 10100 | 1.17 |
| C1a | 9700 | 1.38 |
| C1b | 10200 | 1.26 |
| 2 | 6800 | 1.18 |
| C2a | 6400 | 1.26 |
| C2b | 6900 | 1.30 |
| 3 | 15300 | 1.20 |
| C3 | 14100 | 1.61 |
| 4 | 9400 | 1.31 |
| C4 | 8300 | 1.70 |
| 5 | 12600 | 1.12 |
| C5 | 11500 | 1.34 |
| 6 | 4800 | 1.36 |
| C6 | 4000 | 1.58 |

What is claimed is:

1. A process for the preparation of homo- and copolymers of isobutene by continuous cationic polymerization of isobutene or mixtures of isobutene with ethylenically unsaturated comonomers in the presence of an initiator system comprising:

i) a Lewis acid selected from covalent metal-halogen compounds and covalent semimetal-halogen compounds and

TABLE 1

| Experiment | Method | T [° C.] | $TiCl_4$ mmol/h[1] | Compound I[2] Type | [mmol/h] | Donor[3] Type | [mmol/h] | V[4] [cm/sec] | Solvent[5] |
|---|---|---|---|---|---|---|---|---|---|
| 1 | Helical tube | −60 | 60 | CC | 15 | CPMS | 18 | 4.5 | $CH_2Cl_2$/hexane 2:1 |
| C1a | Conv. tube | −60 | 60 | CC | 15 | CPMS | 18 | 4.5 | $CH_2Cl_2$/hexane 2:1 |
| C1b | Batch | −60 | 60 | CC | 15 | CPMS | 18 | — | $CH_2Cl_2$/hexane 2:1 |
| 2 | Helical tube | −70 | 70 | CC | 21 | BuPS | 35 | 6.0 | $CH_2Cl_2$/hexane 2:1 |
| C2a | Conv. tube | −70 | 70 | CC | 21 | BuPS | 35 | 6.0 | $CH_2Cl_2$/hexane 2:1 |
| C2b | Batch | −70 | 70 | CC | 21 | BuPS | 35 | — | $CH_2Cl_2$/hexane 2:1 |
| 3 | Helical tube | −50 | 55 | p-DCC | 11 | CPMS | 22 | 2.2 | $CH_2Cl_2$/hexane 2:1 |
| C3a | Conv. tube | −50 | 55 | p-DCC | 11 | CPMS | 22 | 2.2 | $CH_2Cl_2$/hexane 2:1 |
| 4 | Helical tube | −70 | 57 | p-DCC | 17 | Pyridine | 34 | 5.5 | $CH_2Cl_2$/hexane/toluene 1:1:1 |
| C4 | Conv. tube | −70 | 57 | p-DCC | 17 | Pyridine | 34 | 5.5 | $CH_2Cl_2$/hexane/toluene 1:1:1 |
| 5 | Helical tube | −70 | 40 | p-DCC | 10 | BuPS | 20 | 7.5 | $CH_2Cl_2$/toluene 2:1 |
| C5 | Conv. tube | −70 | 40 | p-DCC | 10 | BuPS | 20 | 7.5 | $CH_2Cl_2$/toluene 2:1 |
| 6 | Helical tube | −70 | 200 | CC | 30 | pyridine | 70 | 8.0 | $CH_2Cl_2$/toluene 2:1 |
| C6 | Batch | −70 | 200 | CC | 30 | pyridine | 70 | — | $CH_2Cl_2$/toluene 2:1 |

C = Experiments not according to the invention;
[1]Stated amounts in batch experiments are absolute and are not to be understood as being based on unit time
[2]CC = Cumyl chloride (2-chloro-2-phenylpropane), p-DCC = para-dicumyl chloride (1,4-bis(2-chloropropan-2-yl)benzene
[3]CPMS = Dicyclopentyldimethoxysilane; BuPS = Isobutylisopropyldimethoxysilane
[4]Flow rate in the reactor
[5]Stated numbers represent volume ratios of the solvents ii) at least one aprotic organic compound I having at least one functional group FG which forms a carbocation or a cationic complex with the Lewis acid under polymerization conditions in an organic solvent inert with respect to the Lewis acid, wherein the polymerization is carried out in a tubular flow-through reactor which has a plurality of curves having an alternating direction of curvature.

2. A process as claimed in claim 1, wherein the reactor is in the form of a tube winding about at least 2, substantially parallel axes.

3. A process as claimed in claim 2, wherein the reactor is in the form of a tube winding about a plurality of substantially parallel axes arranged in a plane.

4. A process as claimed in claim 2, wherein the reactor is in the form of a tube winding about n substantially parallel axes passing perpendicularly through the vertices of a substantially equilateral polygon, n being an odd number $\geq 3$.

5. A process as claimed in claim 2, wherein the pitch of the winding is from 2 to 10 times the tube diameter (in the case of a circular tube cross section) or the axis pointing in the pitch direction (in the case of an ellipsoidal cross section).

6. A process as claimed in claim 2, wherein the axes are formed by tubes or rods (1).

7. A process as claimed in claim 6, wherein the distance between the tubes or rods (1) is from 1 to 3 times the tube diameter (2).

8. A process as claimed in 2 to 6 claim 2, wherein the helical tube reactor is present in the form of a substantially self-supporting winding.

9. A process as claimed in claim 1, wherein the Lewis acid is selected from $BF_3$, $TiCl_4$, $SnCl_4$, $BCl_3$, $FeCl_3$, $VCl_5$, $AlCl_3$ and $R^c.AlCl_2$, where $R^C$ is $C_1$–$C_6$-alkyl.

10. A process as claimed in claim 1, wherein the functional group in the compound I is of the formula FG (FG)

where

X is selected from halogen, $C_1$–$C_6$-alkoxy and $C_1$–$C_6$-acyloxy, $R^1$ is hydrogen or methyl and $R^2$ is methyl or, with $R^1$ or a moiety to which the functional group FG is bonded, forms a $C_5$–$C_6$-cycloalkyl ring, and $R^2$ may also be hydrogen it the functional group FG is bonded to an aromatic or olefinically unsaturated carbon atom.

11. A process as claimed in claim 1, wherein the compound I is used in an amount of from $10^{-4}$ to $10^{-1}$ mol, based on the functional groups FG of the compound I, per mole of polymerizable monomers.

12. A process as claimed claim 1, wherein the Lewis acid and the compound I are used in a molar ratio of from 20:1 to 1:50, based on the functional groups FG.

13. A process as claimed in claim 1, wherein the initiator system additionally comprises at least one nonpolymerizable, aprotic donor compound having a free electron pair.

14. A process as claimed in claim 13, wherein the donor compound is selected from organosilicon compounds II having at least one Si—O bond.

15. A process as claimed in claim 14, wherein the organosilicon compound is of the formula II:

(II)

where n is 1, 2 or 3, $R^a$ may be identical or different and, independently of one another, are $C_1$–$C_{20}$-alkyl, $C_5$–$C_7$-cycloalkyl, aryl or aryl-$C_1$–$C_4$-alkyl, it being possible for the three last-mentioned radicals also to have one or more $C_1$–$C_{10}$-alkyl groups as substituents, and $R^b$ are identical or different and are $C_1$–$C_{20}$-alkyl or, where n=1 or 2, two different radicals $R^b$ may also form a 2-or 3-membered alkylene unit.

16. A process as claimed in claim 14, wherein the molar ratio of silicon atoms in the organosilicon compound II to (semi)metal atoms in the Lewis acid is from 0.05:1 to 50:1.

17. A process as claimed in claim 1, wherein the solvent is selected from aliphatic and cycloaliphatic hydrocarbons, aromatic hydrocarbons and inert halohydrocarbons.

18. A process as claimed in claim 1, wherein the polymerization is stopped by adding a protic compound.

19. A process as claimed in claim 1, wherein the polymerization is stopped by adding a tri(alkyl)allylsilane compound.

* * * * *